United States Patent
Johnson, Jr.

(10) Patent No.: US 7,107,276 B2
(45) Date of Patent: Sep. 12, 2006

(54) SYSTEMS AND METHODS FOR UNIFORMLY IDENTIFYING E-MAIL ATTACHMENTS

(75) Inventor: Swen R. Johnson, Jr., San Gabriel, CA (US)

(73) Assignee: Xerox Corporation, Stamford, CT (US)

( * ) Notice: Subject to any disclaimer, the term of this patent is extended or adjusted under 35 U.S.C. 154(b) by 477 days.

(21) Appl. No.: 10/270,667

(22) Filed: Oct. 16, 2002

(65) Prior Publication Data
US 2004/0078375 A1 Apr. 22, 2004

(51) Int. Cl.
G06F 17/30 (2006.01)

(52) U.S. Cl. .......................... 707/100; 707/10; 707/101

(58) Field of Classification Search .............. 707/1–10, 707/100, 101, 104.1; 715/752
See application file for complete search history.

(56) References Cited

U.S. PATENT DOCUMENTS

| | | | |
|---|---|---|---|
| 5,862,321 A | 1/1999 | Lamming et al. | |
| 6,144,997 A | 11/2000 | Lamming et al. | |
| 6,397,261 B1 | 5/2002 | Eldridge et al. | |
| 6,505,237 B1* | 1/2003 | Beyda et al. | 709/206 |
| 6,601,102 B1* | 7/2003 | Eldridge et al. | 709/229 |
| 6,785,712 B1* | 8/2004 | Hogan et al. | 709/206 |
| 6,925,571 B1* | 8/2005 | Motoyama et al. | 713/200 |
| 6,993,527 B1* | 1/2006 | Raman et al. | 707/100 |
| 2002/0016818 A1* | 2/2002 | Kirani et al. | 709/203 |
| 2004/0205654 A1* | 10/2004 | Eisen | 715/530 |

* cited by examiner

Primary Examiner—Don Wong
Assistant Examiner—Marc Filipczyk
(74) Attorney, Agent, or Firm—Oliff & Berridge, PLC

(57) ABSTRACT

A uniform identifier record for a digital file comprises a unique identifier field and a textual identifier field. The unique identifier field may comprise a uniform resource locator. Alternately, the unique identifier field may comprise an integer. In one embodiment, the unique identifier is created by adding a constant value to a last prior unique identifier. The textual information is a user-friendly string identifying the file. In applications where the file identified by the uniform identifier record is associated with a separate file, the uniform identifier record is appended to the associated file.

25 Claims, 8 Drawing Sheets

SYSTEMS AND METHODS FOR UNIFORMLY IDENTIFYING E-MAIL ATTACHMENTS

BACKGROUND OF THE INVENTION

1. Field of Invention

This invention generally relates to systems and methods for uniformly identifying digital files.

2. Description of Related Art

High value information is frequently inaccessible to users of wireless-enabled and/or web-enabled personal digital assistants, web-enabled cell phones and the like, which are generally referred to herein as mobile information devices (MID), because this information is embedded as an e-mail attachment inaccessible to software installed on the mobile information device. Mobile information devices include handheld devices that combine computer applications with telephony and/or remote networking features. A mobile information device may be equipped with a hypertext-markup-language (HTML) or wireless access protocol (WAP) browser and/or an e-mail reader.

E-mail attachments may be in any number of file formats, such as, for example, spreadsheet, word processing, or high resolution graphical files. Software applications which can interact with the data format of the attachment file are frequently not installed on the mobile information device. Instead, these applications are installed only on a remote mobile document access server, while the attachments are stored in some repository that is accessible to the server. Therefore, the user of the mobile information device cannot easily access the information embedded in these attachments. The access server allows a remote user to fax, print, and view information stored in corporate repositories. In response to a command issued at the mobile information device, the access server can prepare the attachment for printing or faxing, and may additionally dispatch the prepared attachment to a remote location.

SUMMARY OF THE INVENTION

The document creator applications, e-mail software, communication software, and mobile information device-resident browsers come from various suppliers. Existing methods for accessing the attachments are ad-hoc, and do not work for many combinations of these components.

As outlined above, conventional e-mail attachment identification techniques are typically proprietary and dissimilar. Moreover, conventional methods for accessing e-mail attachments do not work for many software component combinations.

This invention provides systems and methods for uniformly identifying e-mail attachments.

This invention separately provides systems and methods for uniformly identifying e-mail attachments from mobile information devices.

In various exemplary embodiments according to this invention, an electronic file is identified by a record including a unique identifier field and/or a user-friendly textual field. The unique identifier field may be any alphanumeric string that can uniquely identify the document. In various exemplary embodiments, the unique identifier is a uniform resource locator. In various other exemplary embodiments, the unique identifier is an integer. This alphanumeric string may be generated using any known technique. For example, a unique integer identifier may be generated by adding a value incrementor to a previous unique identifier.

In various exemplary embodiments of the systems and methods according to this invention, the user-friendly text is the name of the electronic file. In various other exemplary embodiments, the user-friendly text is a title or text string obtained or extracted from the document, where the title or text string is different from the name of the document.

In various exemplary embodiments of the systems and methods according to this invention, the uniform identifier record is appended to an electronic file to which the file identified by the uniform identifier record is associated. The electronic file may be e-mail. The associated file may be an e-mail attachment.

These and other features and advantages of this invention are described in or apparent from the following detailed description of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
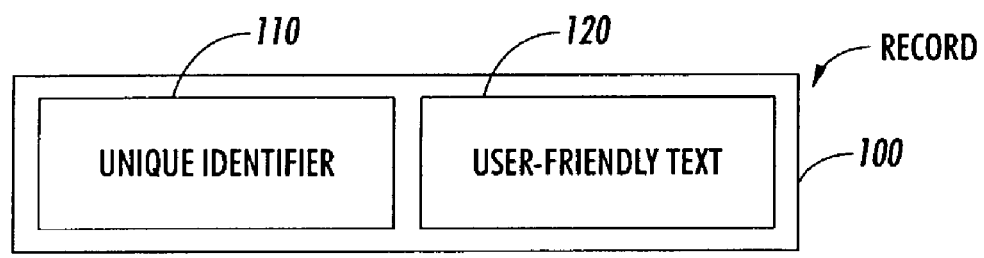
FIG. 1 illustrates one exemplary embodiment of a uniform identifier record according to this invention.

FIG. 1 illustrates one exemplary embodiment of a uniform identifier record 100 according to this invention. As shown in FIG. 1, the uniform identifier record 100 comprises one or both of a unique identifier field 110 and a user-friendly text field 120. The uniform identifier record 100 is generated by a software application or component located at a mobile document access server. The unique identifier (UID) located in the unique identifier field 110 may be a uniform resource locator (URL) specifying the location of the attachment file on the Internet or some other distributed network. Alternately, the unique identifier located in the unique identifier field 110 may be numeric or alphanumeric in nature. Thus, the unique identifier located in the unique identifier field 110 may be a globally unique identifier (GUID). The unique identifier located in the unique identifier field 110 may also be an integer value where each new unique identifier is created by adding a constant to a predecessor unique identifier value.

The user-friendly text field 120 is able to contain any textual information usable to appropriately identify the attachment file. Thus, the text string in the user-friendly text field 120 can be the name of the attachment file. Alternatively, the text string in the user-friendly text field 120 can be the title or any other text string of the document, where the title or other text string can be obtained or extracted from the attachment file and is different from the name of the document.

In various exemplary embodiments, the uniform identifier record 100 is a character string. The unique identifier field 110 and the user-friendly text field 120 portions of the uniform identifier record 100 are delimited by any known or later-developed text delimiter, such as, for example, commas, tabs or any other appropriate non-printing character combinations.

Figure 2:
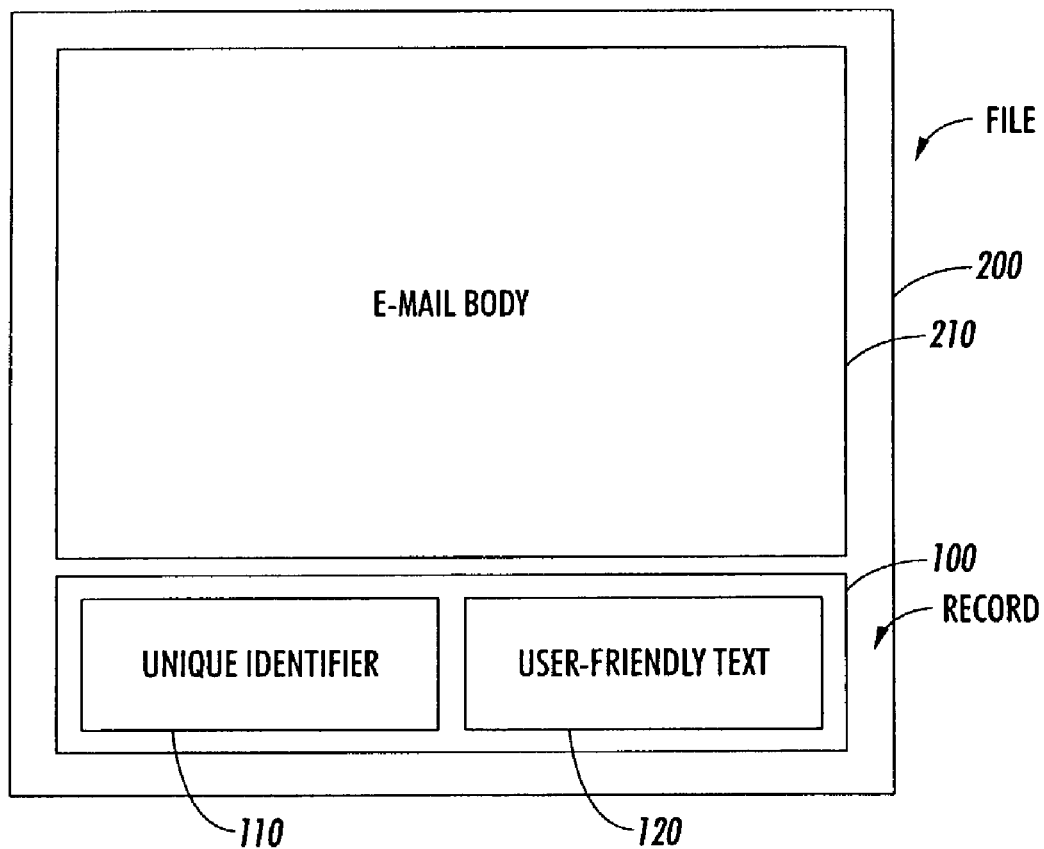
FIG. 2 illustrates one exemplary embodiment of a modified e-mail file according to this invention.

In various exemplary embodiments, the uniform identifier record 100 is appended to the message body of the e-mail file associated with the identified attachment. FIG. 2 illustrates one exemplary embodiment of an e-mail file 200 modified in accordance with the invention to include one exemplary embodiment of a uniform identifier record. As shown in FIG. 2, the e-mail file 200 includes the uniform identifier record 100 appended to the original e-mail body 210. More than one uniform identifier record 100 may be appended to the e-mail body 210 when the e-mail file 200 contains more than one attachment.

Figure 3:
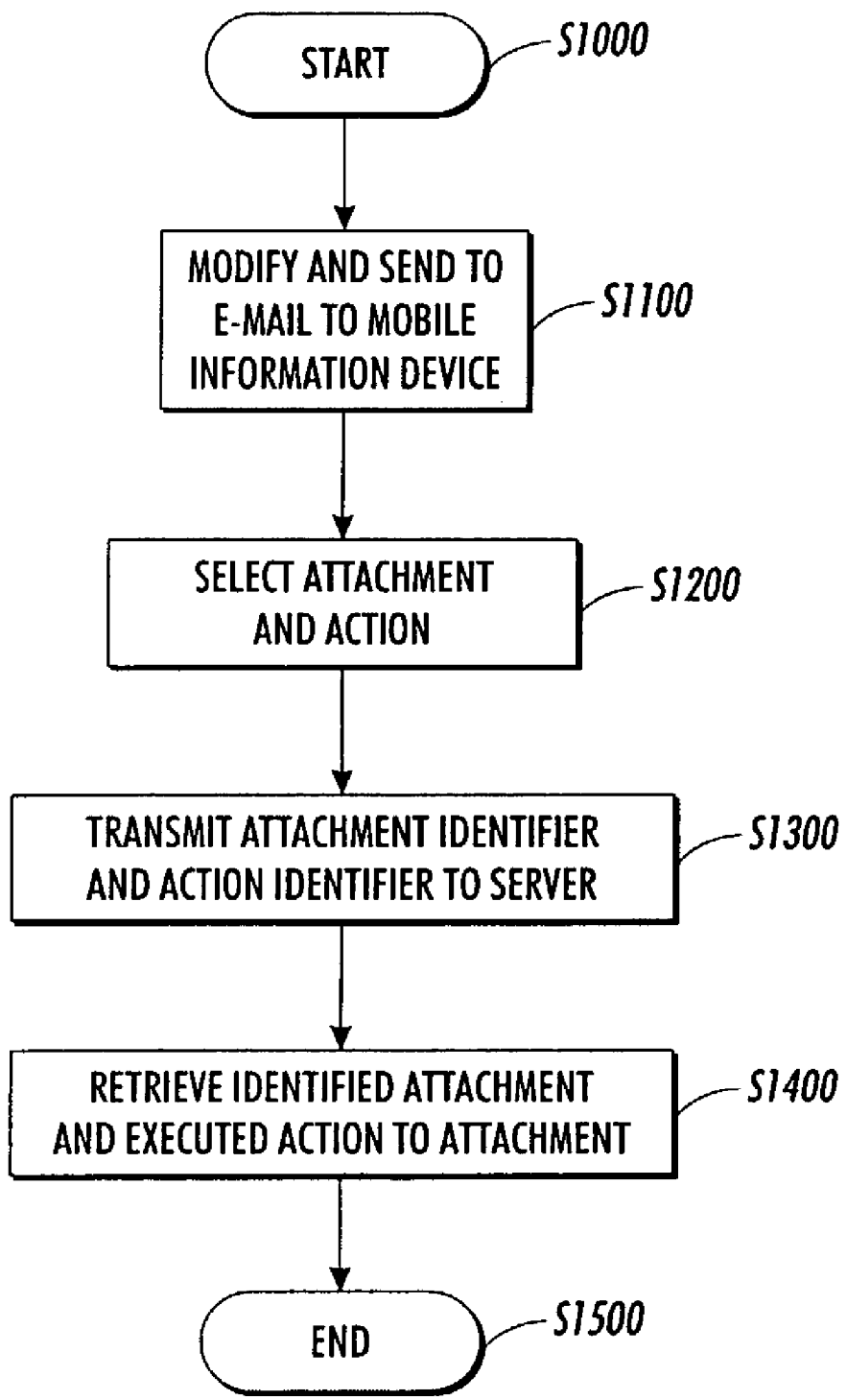
FIG. 3 is a flowchart outlining one exemplary embodiment of a method for processing e-mail attachments at an access server under the direction of a remote user according to this invention.

FIG. 3 is a flowchart outlining one exemplary embodiment of a method for processing an e-mail attachment at an access server under the direction of a remote user. As shown in FIG. 3, operation of the method begins in step S1000, and continues to step S1100, where an e-mail file associated with an attachment file and addressed to a remote user, who is accessing the e-mail using a mobile information device, is modified to include a uniform identifier record according to this invention and is sent to the mobile information device. Then, in step S1200, the user-friendly attachment identifier and an action to be performed on the attachment are selected. The selected action may be faxing, printing, and/or any other appropriate known document processing task. Next, in step S1300, the attachment identifier and an action identifier identifying the selected action are transmitted to the server. Then, in step S1400, the server retrieves the attachment identified by the attachment identifier and executes the action identified by the action identifier against the attachment. Operation then continues to step S1500, where operation of the method ends.

Figure 4:
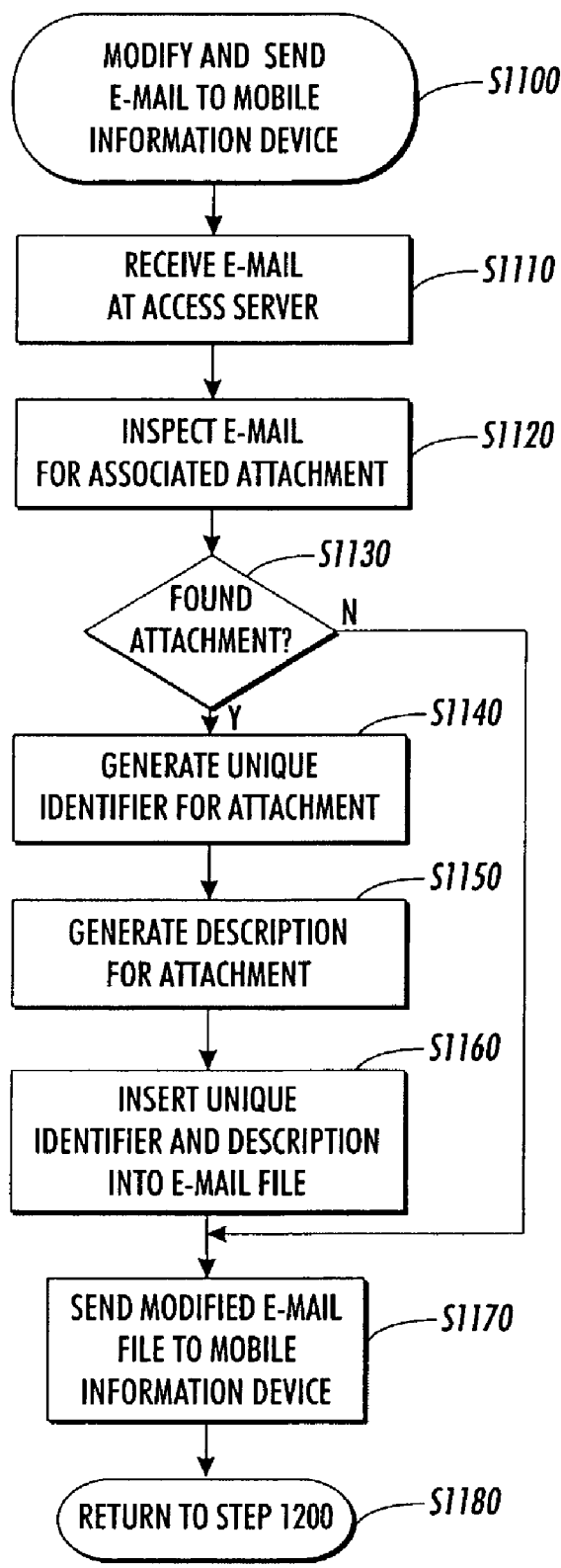
FIG. 4 is a flowchart outlining in greater detail one exemplary embodiment of the method for generating uniform identifier records for e-mail attachments at an access server and transmitting these records to a remote user of FIG. 3.

FIG. 4 is a flowchart outlining in greater detail one exemplary embodiment of a method for generating the uniform identifier and transmitting the modified e-mail file to the mobile information device of step S1100. As shown in FIG. 4, operation of the method begins in step S1100, and continues to step S1110, where an e-mail file is received at an access server, or at some other repository on a network accessible to an access server. The e-mail is addressed to a remote user. Then, in step S1120, the e-mail is inspected to determine whether an associated file is attached to the email. Next, in step S1130, a determination is made as to whether the received email file is associated with an attachment file. If not, operation jumps to step S1170. Otherwise operation continues to step S1140.

In step S1140, a unique identifier is generated for the attachment file. Next, in step S1160, a user-friendly description is generated for the attachment file. Then, in step S1170, the unique identifier and user-friendly description are inserted as a uniform identifier record into the message body of the e-mail file. Operation then continues to step S1170.

In step S1170, the e-mail file is sent to the mobile information device being used by the remote user to access the e-mail. Then, in step S1180, operation of the method returns to step S1200. It should be appreciated that, in various exemplary embodiments, the user-friendly text field 120 may not be appended to the email body since its purpose is merely to aid the human user of the mobile information device in distinguishing one attachment from another. In particular, when an email message has no more than one attachment, a user-friendly text field may be deemed unnecessary, and therefore omitted. In this case, step S1150 is skipped or omitted. Then, in step S1160, only the generated one of the unique identifier field 110 or the user-friendly text 120 is inserted into the email.

It should be appreciated that, in various exemplary embodiments of the invention, the user-friendly description may be a unique identifier for the attachment file. In these exemplary embodiments, the user-friendly description is a unique identifier at least in the context of the mobile document access server.

Figure 5:
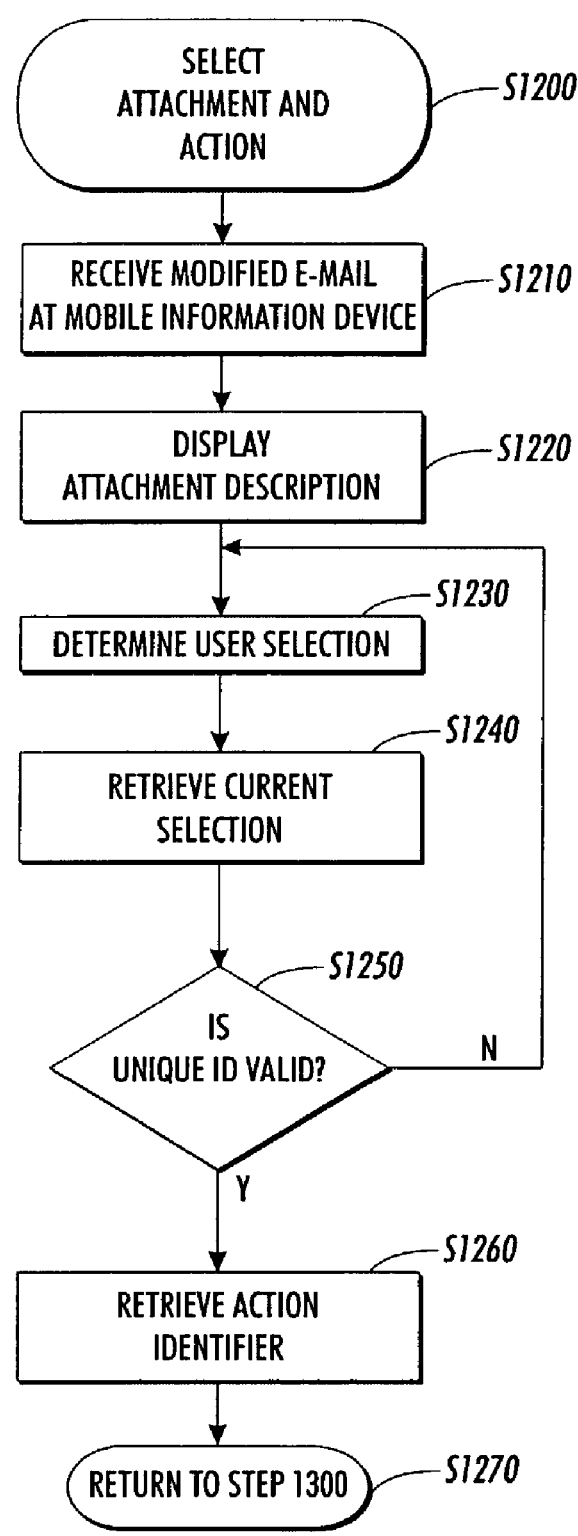
FIG. 5 is a flowchart outlining in greater detail one exemplary embodiment of a method for indicating e-mail attachments for further processing based on selecting a uniform identifier and transmitting the uniform identifier to an access server of FIG. 3.

FIG. 5 is a flowchart outlining in greater detail one exemplary embodiment of the method for processing the uniform attachment identifier at a mobile information device of step S1200. As shown in FIG. 5, operation of the method begins in step S1200, and continues to step S1210, where a modified e-mail file is received at the mobile information device. Next, in step S1220, the user-friendly description of the attachment is displayed in a manner associating the attachment file with the received e-mail. The user-friendly description may be displayed iconically, in tabular format, or as a description embedded in and/or following the main e-mail file body. Operation progresses from step S1220 to step S1230, and remains in step S1230 until the user indicates a selection. Once a selection is indicated, operation continues to step S1240.

In step S1240, the current selection is retrieved. Next, in step S1250, a determination is made whether the selection contains or is associated with a valid unique identifier. If not, operation returns to step S1230. Otherwise, operation continues to step S1260.

In step S1260, an action identifier associated with the selected action is retrieved. The action identifier may be a character string similar or identical to the menu selection of the action selected. Alternately, the action identifier may be a numeric identifier associated with the action. Then, in step S1270, operation of the method returns to step S1300.

The unique identifier determined in step S1250 may be stored in a database local to the mobile information device. In various exemplary embodiments, the unique identifier is removed or copied from the e-mail file before the attachment information is displayed. Alternately, in various other exemplary embodiments, the unique identifier may be retrieved from the e-mail file itself after the attachment is selected. In these exemplary embodiments, the unique identifier is not displayed with the user-friendly text. In still other exemplary embodiments, the unique identifier is user-friendly text.

The action determined in step S1260 may be any action that may be appropriately invoked against the selected file.

For example, the file can be faxed to any location. Alternatively, the file can be printed. Moreover, the file can be e-mailed to another user. In most cases, this will involve gathering further information from the user, i.e., having the user supply and/or identify further information. For example, to fax the attachment, the user will need to supply the phone number of a receiving fax machine. In various exemplary embodiments, the information is gathered when the user indicates that an action is to be performed on the attachment. In various exemplary embodiments, the further information is gathered, for example, using a pop-up dialog box or other user-interface widget or mechanism appropriate to the mobile information device involved.

Figure 6:
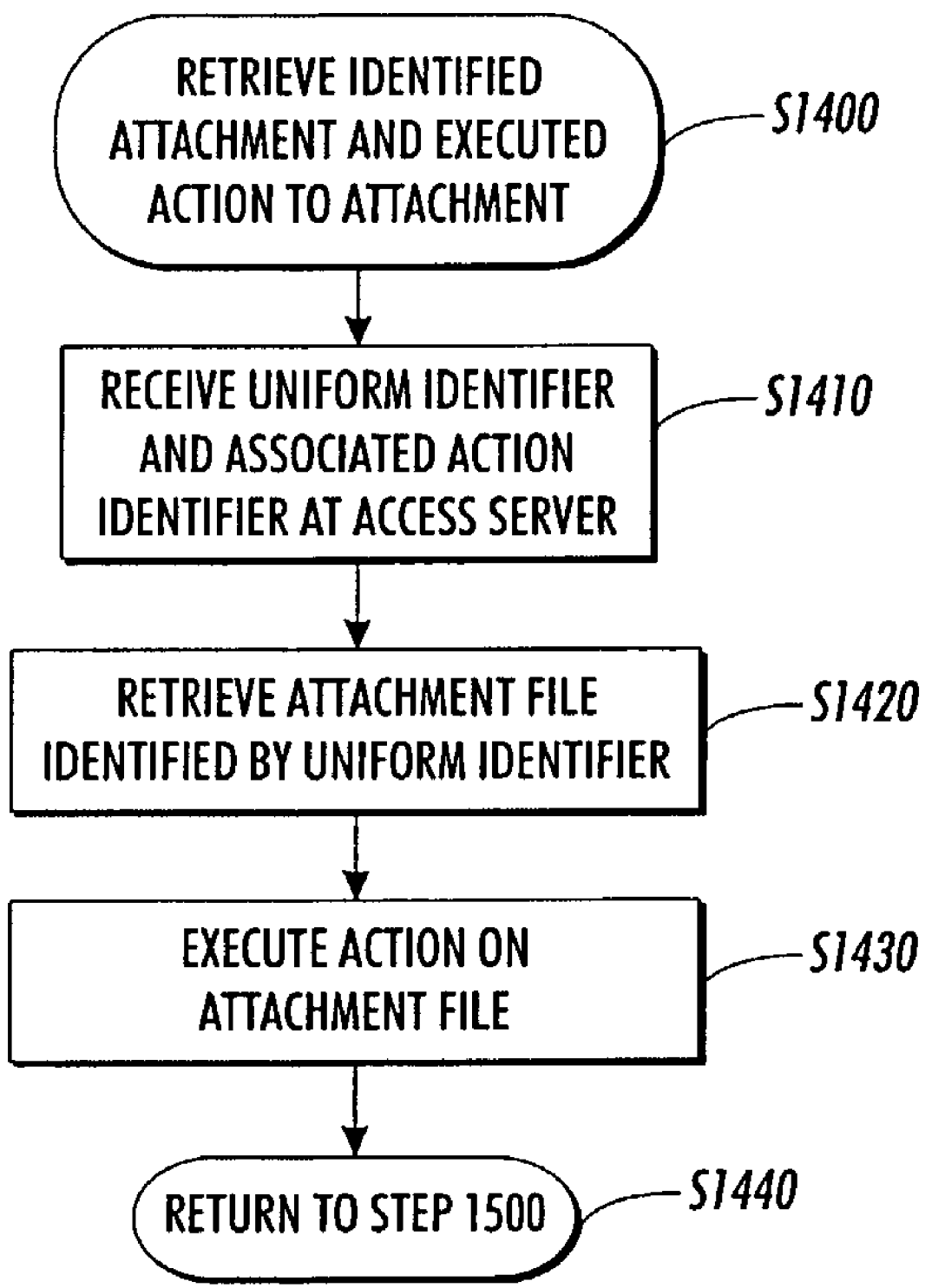
FIG. 6 is a flowchart outlining in greater detail one exemplary embodiment of a method for processing an e-mail attachment identified by a uniform identifier at an access server under the direction of a remote user of FIG. 3.

FIG. 6 is a flowchart outlining in greater detail one exemplary embodiment of the method for processing at an access server an attachment file identified by a uniform identifier of step S1400. As shown in FIG. 6, operation of the method begins in step S1400, and continues to step S1410, where the unique identifier and an associated action identifier are received at an access server. Then, in step S1420, the attachment file identified by the unique identifier, (or alternatively or additionally by the user-friendly text string) is retrieved. Next, in step S1440, the attachment file is processed according to the action identified by the action identifier. Thus, for example, if the action is to fax the document, a software fax application is executed from the access server, the attachment file is instantiated, and then the identified document is faxed by the application. Then, in step S1450, the operation of the method returns to step S1500.

Figure 7:
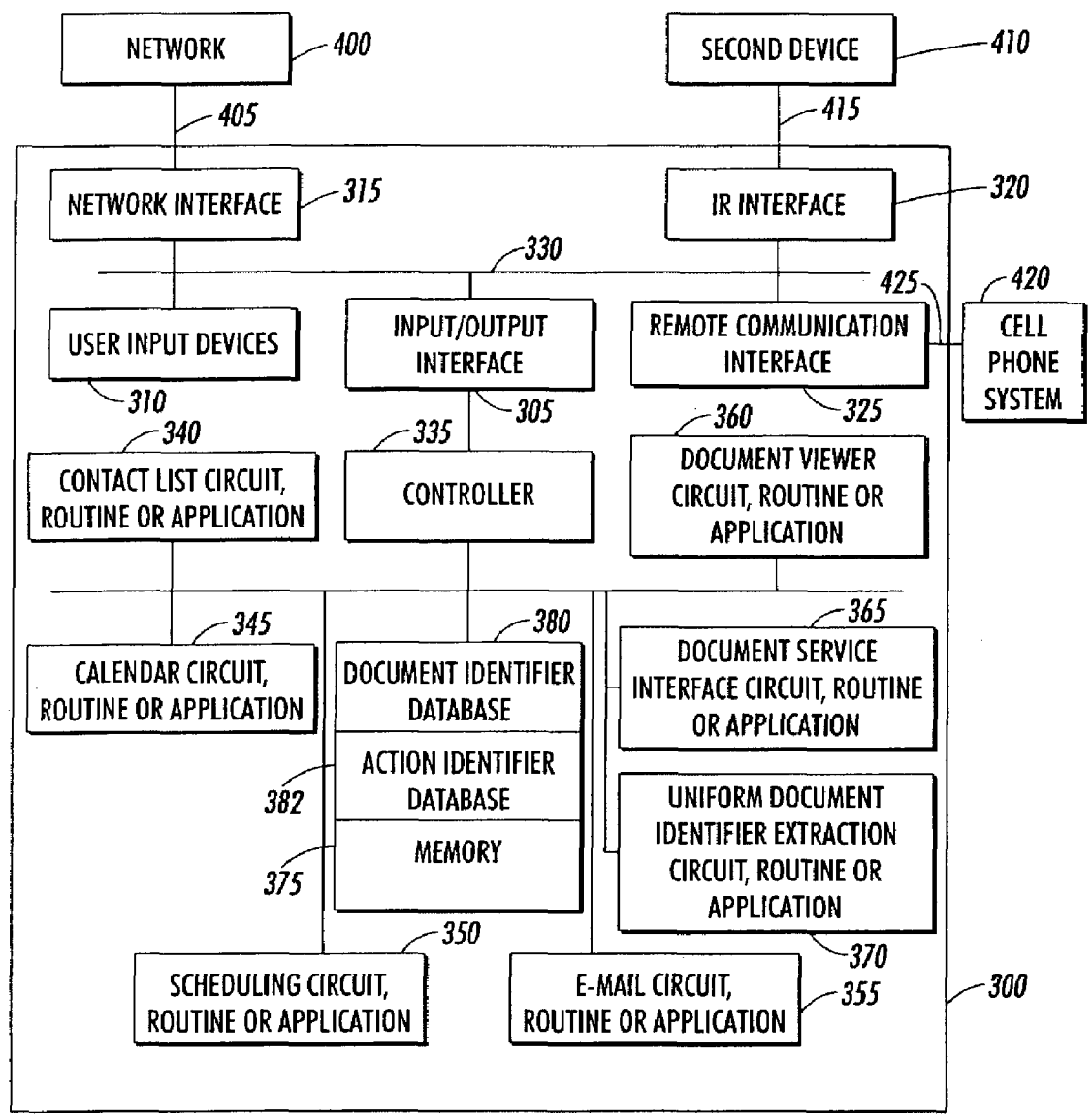
FIG. 7 is a block diagram showing an exemplary embodiment of a uniform document identifier extraction system according to this invention.

FIG. 7 shows an exemplary embodiment of a uniform document identifier extraction system 300 according to this invention. As shown in FIG. 7, the uniform document identifier extraction system 300 includes an input/output interface 305, a controller 335, a memory 375, user input devices 310, a network interface 315, an IR interface 320, a remote communication interface 325, a contact list circuit, routine or application 340, a calendar circuit, routine or application 345, a scheduling circuit, routine or application 350, an e-mail circuit, routine or application 355, a document viewer circuit, routine or application 360, a document service interface circuit, routine or application 365, and a uniform document identifier extraction circuit, routine or application 370, each interconnected by one or more data/control buses or application programming interfaces 330.

The system 300 is implemented on a standard mobile information device. Thus, the user input devices 310 may include a handwriting recognition circuit, routine or application activated by a stylus, a keyboard or a keyboard emulator circuit, routine or application. The network interface 315 enables the mobile information device to communicate with an external network 400 via a link 405. The IR interface 320 enables the mobile information device to beam, via an IR communication protocol 415, documents and software to a second device 410. The remote communication interface 325 enables the mobile information device to communicate with a cell phone system 420 via a cellular telephone network 425. Thus, the mobile information device may be in communication with, for example, other mobile information devices and remote computer systems, via the cell phone system 420. The user input devices 310, the network interface 315, the IR interface 320, and the remote communication interface 325, are in communication with the controller 335 via the input/output interface 305.

In various exemplary embodiments, the controller 335 is in communication with the contact list circuit, routine or application 340. In various exemplary embodiments, the contact list circuit, routine or application 340 enables a user of the mobile information device to store and retrieve names, addresses and telephone numbers. In various exemplary embodiments, the controller 335 is also in communication with the calendar circuit, routine or application 345. In various exemplary embodiments, the calendar circuit, routine or application 345 enables a user of the mobile information device to keep track of appointments, data sensitive notes, and/or deadlines. In various exemplary embodiments, the controller 335 is also in communication with a scheduling circuit, routine or application 350. In various exemplary embodiments, the scheduling circuit, routine or application 350 enables a user of the mobile information device to assign and prioritize tasks.

In various exemplary embodiments, the controller 335 is also in communication with an e-mail circuit, routine or application 355. In various exemplary embodiments, the e-mail circuit, routine or application 355 enables a user of the mobile information device to read and write e-mail. In other exemplary embodiments of the e-mail circuit, routine or application 355, e-mail may be sent to or received from remote locations via the network interface 315, the IR interface 320, or the remote communication interface 325. In various exemplary embodiments, the controller 335 is also in communication with a document viewer, circuit, routine or application 360. In various exemplary embodiments, the document viewer circuit, routine or application 360 enables a user of the mobile information device to view mobile information device-enabled documents. In various exemplary embodiments, the document service interface circuit, routine or application 360 enables a user of the mobile information device to read and write a word-processor style document.

In various exemplary embodiments, the controller 335 is also in communication with a document service interface circuit, routine or application 365 and a uniform document identifier extraction circuit, routine or application 370. In various exemplary embodiments of the extraction circuit, routine or application 370, a uniform document identifier record that has been inserted into a computer file is extracted from the file in accordance with the method described in relation to FIG. 4. In one embodiment, the document service interface circuit, routine or application 365 enables a user of the mobile information device to interact with the unique identifier extracted by the uniform document identifier extraction circuit, routine or application 370, to select actions, and to generate a uniform identifier/action identifier pair.

The memory 375 includes one or more of a document identifier database portion 380 and an action identifier database portion 382. In various exemplary embodiments, the action identifier database portion 382 stores identifiers relating to actions that can be executed on a computer file at a remote server by any circuit, routine or application executed from a mobile document access server. The document identifier database portion 380 stores the identifiers for the remote computer files. In various exemplary embodiments, the document identifier database portion 380 stores records comprising unique document identifiers and user-friendly descriptive text. In various exemplary embodiments, the database portion 380 stores the unique identifiers retrieved in step S1240 of FIG. 5. The action identifier database portion 382 and the document identifier database portion 380 are utilized by the document service interface circuit, routine or application 365 and the uniform document identifier extraction circuit, routine or application 370. In various embodiments, the memory stores one or more control routines used by the controller 335 to operate the uniform document identifier extraction system 300.

The memory 375 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable for fixed memory can be implemented using any one or more of ROM, PROM, EPROM, EEPROM, an optical ROM disk, such as CD-ROM or DVD-ROM disk, and disk drive or the like.

It should be understood that each of the circuit, routine or applications shown in FIG. 7 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 7 will take is a design choice and will be obvious and predictable to those skilled in the art.

Figure 8:
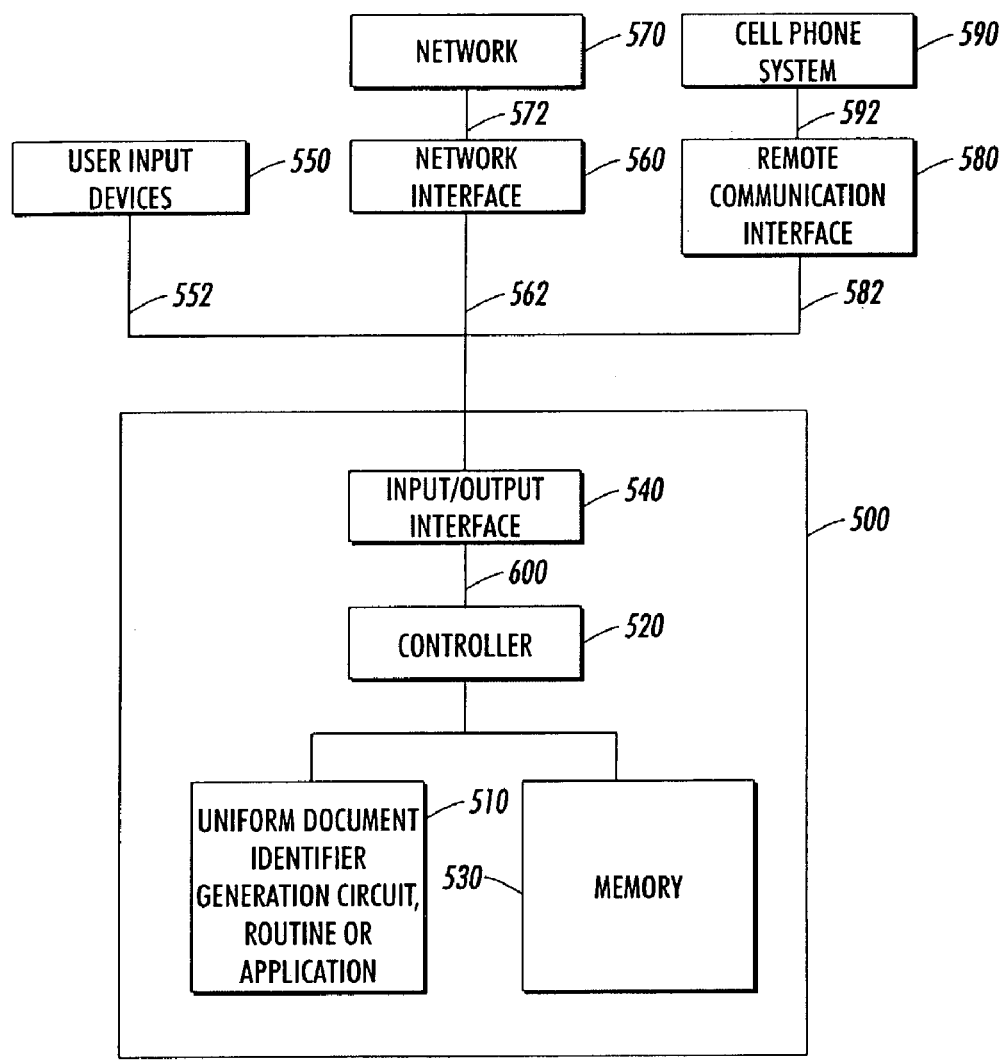
FIG. 8 is a block diagram showing an exemplary embodiment of a uniform document identifier generation system according to this invention.

FIG. 8 shows one exemplary embodiment of a uniform document identifier generation system 500 according to this invention. As shown in FIG. 8, the uniform document identifier system 500 includes a uniform document identifier generation circuit, routine or application 510, a controller 520, a memory 530, and an input/output interface 540, each interconnected by one or more data/control buses or application programming interfaces 600. As further shown in FIG. 8, one or more user input devices 550 are connected over one or more links 552 to the input/output interface 540. Additionally, a network interface 560 is connected to the input/output interface 540 over a link 562. The network interface 560 enables the input/output interface 540 to communicate with an external network 570 over one or more links 572. Further, a remote communication interface 580 is connected to the input/output interface 540 over a link 582. The remote communication interface 580 enables the input/output interface 540 to communicate with a cell phone system 590 over a link 592.

Each of the links 552, 562, 572, 582 and 592 can be implemented using any known or later developed device or system for connecting the corresponding one or more user input devices 550, the network interface 560, the remote communication interface 580, the external network 570, and the cell phone system 590, respectively, to the uniform document identifier generation system 500, including a direct cable connection, a connection over a wide area network, a connection over an intranet, a connection over the Internet, or a connection over any other distributed processing network or system. In general, each of the links 552, 562, 572, 582 and 592 can be any known or later developed connection system or structure usable to connect the corresponding one or more user input devices 550, the network interface 560, the remote communication interface 580, the external network 570, and the cell phone system 590, respectively, to the uniform document identifier generation system 500.

The input/output interface 540 inputs data from the network 570, the cell phone system 590 and/or the one or more user input devices 550 and outputs data to the network 570 and/or the cell phone system 590. The input/output interface 540 also outputs data to one or more of the controller 520, the memory 530 and/or the uniform document identifier generation circuit, routine or application 510 and receives data from one or more of the controller 520, the memory 530 and/or the uniform document identifier generation circuit, routine or application 510.

The memory 530 includes one or more of a document identifier database portion 532 and an action identifier database portion 534. In various exemplary embodiments, the action identifier database portion 534 stores identifiers usable to identify actions that can be executed on a computer file located on the access server or at a remote server by any circuit, routine or application executed from the mobile document access server. The document identifier database portion 532 stores identifiers sent to mobile information devices usable to identify computer files. In various exemplary embodiments, the document identifier database portion 532 stores records comprising unique document identifiers and user/friendly descriptive text. In various exemplary embodiments, the document identifier database portion 532 stores unique identifiers generated according to step S1140 of FIG. 4. The action identifier database portion 532 and the document identifier database portion 534 are used by the uniform document identifier generation circuit, routine or application 510. In various embodiments, the memory 530 stores one or more control routines used by the controller 520 to operate the uniform document identifier generation system 500.

The memory 530 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

It should be understood that each of the circuit, routine or applications shown in FIG. 8 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 8 will take is a design choice and will be obvious and predictable to those skilled in the art.

Figure 9:
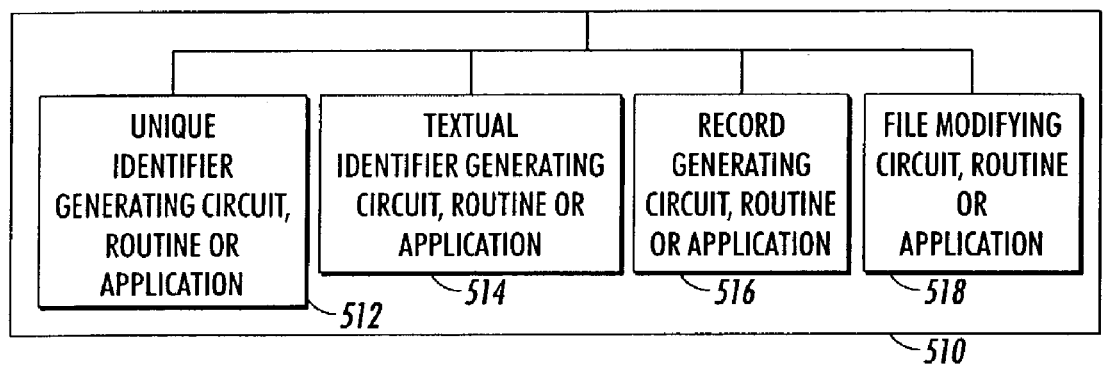
FIG. 9 is a block diagram showing the exemplary components of the uniform document identifier generation circuit, routine or application embodiment of FIG. 8.

FIG. 9 shows in greater detail one exemplary embodiment of the uniform document identifier generation circuit, routine or application 510 in accordance with the invention. As shown in FIG. 9, the uniform document identifier generation circuit, routine or application 510 includes one or more of a unique identifier generating circuit, routine or application 512, a textual identifier generating circuit, routine or application 514, a record generating circuit, routine or application 516, and/or a file modifying circuit, routine or application 518. In various embodiments of the invention, the operation of the uniform document identifier generation circuit, routine or application 510 has been described with reference to FIG. 4.

While this invention has been described in conjunction with the exemplary embodiments outlined above, it is evidenced that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method that uniformly identifies an electronic file attached to a computer file, comprising:
    receiving a computer file by an access server;
    inspecting the computer file by the access server to determine whether an electronic file is associated with the computer file as an attachment;
    generating an identifier for the electronic file;
    modifying the computer file by inserting the identifier into the computer file with which the electronic file is associated to identify the electronic file,
    determining that at least one destination address to which the computer file is addressed is a mobile device;
    storing the electronic file with the identifier in the access server; and
    forwarding the computer file modified with the identifier inserted to the mobile device,
    wherein the access server receives from the mobile device an indication of at least one action from among a plurality of stored actions to be taken regarding the electronic file, the received indication comprising (a) the identifier that was inserted into the forwarded computer file to identify the electronic file to be acted on; and (b) a selection of the at least one action from among the plurality of stored actions to be taken regarding the electronic file, and
    the access server, in response to the received indication, retrieves the stored electronic file by referencing the identifier and executes the at least one action to be taken regarding the retrieved electronic file.

2. The method of claim 1, wherein the identifier for the electronic file, comprises at least one of a unique identifier field for the electronic file, or a textual identifier for uniquely identifying the electronic file.

3. The method of claim 2, wherein the unique identifier field comprises a text string.

4. The method of claim 3, wherein the text string is inserted into the computer file.

5. The method of claim 3, wherein the text string is appended to the computer file.

6. The method of claim 2, wherein the textual identifier field comprises a text string.

7. The method of claim 6, wherein the text string is inserted into the computer file.

8. The method of claim 6, wherein the text string is appended to the computer file.

9. The method of claim 2, wherein the unique identifier is a uniform resource locator.

10. The method of claim 2, wherein the unique identifier is an integer.

11. The method of claim 1, wherein the identifier is a uniform resource locator.

12. The method of claim 1, wherein the identifier is an integer.

13. The method of claim 12, wherein generating the identifier, comprises incrementing the integer on each subsequent occurrence of detecting an electronic file associated with a computer file.

14. A computer program product, comprising a computer usable medium having computer readable program code usable to cause a computer to execute the method of claim 1.

15. An information storage medium on which is stored information regarding a program for executing the method of claim 1.

16. The method of claim 1, wherein the computer file is an e-mail file.

17. The method of claim 16, wherein the electronic file is an attachment to the e-mail file.

18. The method of claim 1 wherein the at least one action to be taken is one of (a) formatting and printing the electronic file on a document printing device; (b) executing facsimile transmission of the electronic file to a facsimile receiving device; or (c) forwarding the electronic file to a destination address that is not a mobile device.

19. A system that uniformly identifies an electronic file attached to a computer file, the system comprising:
    an identifier generation circuit, routine or application that generates an identifier for an electronic file that is associated with a computer file as an attachment when it is determined that at least one destination address to which the computer file is addressed is a mobile device, the identifier generation circuit, routine or application, comprising:
    at least one of a unique identifier generating circuit, routine or application that generates a unique identifier for the electronic file or a textual identifier generating circuit, routine or application that generates a textual identifier for uniquely identifying the electronic file; and
    a file modifying circuit, routine or application that inserts the at least one of the generated unique identifier or the generated textual identifier into the computer file with which the electronic file is associated to identify the electronic file,
    a memory unit that includes a file identifier database that stores a plurality of generated unique identifiers and corresponding electronic files, and an action identifier database that stores a plurality of user-selectable actions to be executed on electronic files,
    a document service interface circuit, routine or application usable to at least (a) review a computer file and detect an electronic file associated with the computer file as an attachment, (b) command the identifier generation circuit, routine or application to generate the at least one of the unique identifier or the textual identifier for the electronic file that is associated with a computer file, (c) store the at least one of the generated unique identifier or the generated textual identifier for the electronic file together with the electronic file in the file identifier database, and (d) based on a received indication to execute at least one user-selected action regarding an electronic file from a mobile device, retrieve the electronic file by referencing the at least one of the generated unique identifier or the generated textual identifier for the electronic file in the file identifier database, retrieve action information regarding the at least one user-selected action to be taken regarding the electronic file from among the plurality of user-selectable actions stored in the action identifier database, and execute the at least one user-selected action on the retrieved electronic file based on the retrieved action information.

20. The system of claim 19, wherein the unique identifier is a uniform resource locator.

21. The system of claim 19, wherein the unique identifier is an integer.

22. The system of claim 21, wherein the unique identifier generating circuit, routine or application further comprises an incrementing circuit, routine or application that increments the integer on each instance that the unique identifier is generated by the unique identifier generating circuit, routine or application.

23. The system of claim 19, wherein the file modifying circuit, routine or application appends the identifier to the computer file.

24. The system of claim 19, further comprising:
a remote communication interface for communicating with at least one mobile device that is usable to determine that at least one destination address to which the computer file is addressed is at least one of the at least one mobile device,
wherein the computer file is forwarded to the at least one of the at least one mobile device in a modified form in which the at least one of the generated unique identifier or the generated textual identifier for the electronic file is inserted in the computer file.

25. The system of claim 24, wherein the document service interface circuit, routine or application is usable, receives the indication to execute at least one user-selected function regarding the electronic file from at least one mobile device via the remote communications interface.

* * * * *